Patented Apr. 4, 1939

2,153,487

UNITED STATES PATENT OFFICE 2,153,487

COMPOSITION FOR COATING FRUITS AND VEGETABLES

Jagan N. Sharma, West Los Angeles, Calif., assignor to Food Machinery Corporation, San Jose, Calif., a corporation of Delaware No Drawing. Application August 2, 1937, Serial No. 156,957

16 Claims. (Cl. 99—168)

This invention relates to the art of coating or treating fruits and vegetables with materials of waxy nature for the purpose of retarding evaporation, shrinkage and decay of the fruit and for the purpose of imparting to the fruit a desirable glossy, polished, smooth or lustrous appearance. More particularly, the invention relates to a composition, in liquid form, adapted for coating fruits and vegetables and to a process of manufacturing and using the same.

Heretofore, citrus fruits have been coated with various waxy or wax-like compositions for the purpose of polishing the fruit and retarding evaporation. Paraffin wax has been extensively used for this purpose. Paraffin wax has been applied to citrus fruit by permitting brushes to contact with slabs of wax and then rubbing the wax upon the fruit by liquefying the wax and atomizing it on the fruit, by melting the wax, permitting it to form a film on the surface of water and then allowing the fruit to pass through such film, and in other manners. These prior methods of application are not entirely satisfactory. When, for example, the wax is dissolved in a volatile solvent and the fruit sprayed or immersed in this solution, the resulting coating is dull and lacks the lustre desired on citrus fruit. Atomizing and brushing systems are expensive because of the large quantities of wax that are wasted or ineffectively applied. Another disadvantage of the prior methods is that in most cases elevated temperatures (ranging from about 95° F. to 120° F.) must be employed and moreover the fruit need be dry before the wax is applied. A still further disadvantage of the prior methods is the difficulty of regulating the thickness of the resulting film or coating on the fruit. Obviously, a thick film detracts from the finished appearance of the fruit. Some fruits are provided with skins or peels which are difficultly wetted such as, or example, apricots, and an aqueous emulsion will not wet such surfaces nor permit the waxy constituent to uniformly cover the fruit.

It is the general object of the present invention to provide an emulsion or dispersion for coating fruits and vegetables such as citrus fruits, cantaloups, apricots, tomatoes, etc., whereby a readily regulated film of the desired character may be applied to fruit without necessarily predrying the fruit. The emulsion may be applied to citrus fruits, for example, while such citrus fruits are still wet from the preceding washing or cleansing bath. The coating compositions of this invention, furthermore, thoroughly wet the surfaces of the fruit without the formation of drops on the surface, thereby producing a film of uniform thickness. In addition, the coating compositions of this invention dry very quickly and form a film which is glossy without the necessity of polishing the fruit or with only a minor brushing or polishing operation.

Another object of the invention is to disclose and provide an aqueous coating composition, in the form of an emulsion or suspension, which may be made in concentrated form and then diluted with appropriate quantities of water for the purpose of forming a desired coating composition.

I have discovered that various mineral and vegetable waxes, such as montan wax, paraffin wax, carnauba wax, candelilla wax, and the like, may be readily dispersed and suspended in an aqueous medium in the presence of the products of reaction between certain types of shellac and alkali reagents. The resulting aqueous suspension or dispersion is stable both in concentrated form and in dilute form and may be readily applied to fruits and vegetables at normal atmospheric temperatures or at temperatures up to about 130° F. Such dispersions will readily wet the external surfaces of the fruit and/or vegetables to form a film of uniform thickness and will furthermore dry quickly. The fruit or vegetables need not be dry at the time of suspension or dispersion is applied thereto and a suitable film or coating may be formed on the fruit by simply immersing the fruit in such dispersion or by spraying the dispersion over the fruit and then permitting the fruit to drain and dry. The fruit will be dried and provided with a thoroughly distributed waxy coating in about two minutes' time. The coating composition appears to break very quickly upon contact with the surface of the fruit, depositing the waxy constituents thereon. When carnauba wax is used as one of the dispersing constituents, the film formed on the fruit is glossy and lustrous, rendering it unnecessary to brush the fruit in order to secure the desired polished appearance.

The property of drying quickly is of particular value in the treatment of fruit provided with depressions, such as stem cavities or navels (as in the case of navel oranges). Ordinarily, it is extremely difficult to remove aqueous washing solutions from such cavities and decay often originates therein. The present coating composition permeates these cavities readily and dries quickly therein.

The various objects, uses, advantages, modifications and adaptations of the invention will best be understood from the following detailed description of the invention and from a contemplation of a specific example thereof.

The coating composition may be prepared from any desired waxy constituents such as paraffin, carnauba, candelilla or montan wax, hydrogenated vegetable oils, or mixtures of such waxy ingredients. The composition should also contain reaction products of shellac and an alkaline material. For very light-colored fruit such as, for example, lemons, the refined grades of shellac are preferred and that grade of shellac known as "bone dry" dewaxed and decolorized shellac has been found to be most effective. Other grades of shellac, such as mechanically refined shellac, may also be used. The shellac need not be decolorized nor bone dry at the time it is incorporated into the composition.

Shellacs from which the naturally occurring wax has been removed during the refining process are preferred, however. By using dewaxed shellac (either in bone dry, decolorized or in hank form, that is, containing say 12% to 16% of water) the quick drying properties are attained and the resulting composition exhibits a low surface tension. Base compositions of this invention will generally possess surface tensions of about 20–26 dynes, while the dilute compositions have surface tensions of from about 24 to 30 dynes. Of the alkaline substances adapted for use in saponifying the shellac or reacting therewith, soda ash, sodium hydroxide, potassium hydroxide, ammonia, borax and triethanolamine are examples.

In preparing the dispersions or suspensions of this invention, a suitable quantity of shellac is added to a heated body of water containing the alkali in solution. In a separate batch a mixture of the desired waxes in melted condition is suspended in another body of hot water. Soap may be formed at the time the wax is dispersed and when soap is used in making the waxy dispersion, the soap may be present in amount constituting from about 10% to 25% of the water. After these two batches have been cooled, they are intermixed, the resulting suspension being relatively stable and uniform. If desired, instead of making a soap solution by actual formation of a soap therein, a desired quantity of preformed soap may be added to the water to make the solution in which the wax is dispersed. Furthermore, instead of cooling the two batches and then intermixing with vigorous agitation, the two batches may be mixed while still hot and agitated during the cooling process. In this latter modification, agitation should be continued until the temperature falls below about 90° or 100°, in order to prevent the wax from agglomerating. When the two batches are separately cooled they should be below 90° F. or 100° F. before being intermixed.

As has been stated before, the coating composition may be made either in the form of a concentrated base (capable of being subsequently diluted with appropriate quantities of water) or it may be made in the more dilute final form directly. When in concentrated form, the final composition may contain, for example, from about 8% to 20% of waxy ingredients and from about 4% to 10% of shellac (on a dry basis). The ratio between the shellac and the waxy constituents is preferably maintained between about 1 to 1 and 1 to 4, i. e., the shellac may comprise from 20% to 100% of the waxy constituents. Finished or dilute dispersions, particularly adapted for the treatment of fruits and vegetables, may contain from about 0.75% to about 3% or 4% of waxy ingredients, and from about 0.15% to 4% of shellac. In commercial use on citrus fruit, finished compositions containing from about 2½% to 3% of waxy constituents and from about 1.2% to 1.8% of shellac have been found particularly useful. Ordinarily, less than about 0.37% or more than 2% or 2½% of shellac need not be used and in all instances the quantity of wax in the finished composition should be equal to or in excess of the amount of shellac present within the ratio heretofore stated.

As an example of the method of preparing the composition in concentrated form, the following ingredients, conditions and steps have been used:

20 pounds of triethanolamine are added to 1000 pounds of water and the mixture heated to about 160° F. Instead of using triethanolamine, about 8½ pounds of sodium hydroxide can be used or other equivalent amount of other alkalies. 100 pounds of refined dewaxed shellac are then slowly added to the hot alkaline solution and the mixture preferably thoroughly agitated during addition. A separate batch of 1000 pounds of water containing about 6 pounds of sodium hydroxide in solution is heated to a temperature slightly below boiling and above the melting point of the waxes to be used. A temperature of about 200° F. has been found eminently suitable. To this body of hot alkaline solution there is poured with accompanying agitation a melted mixture of waxes and a free fatty acid such as stearic acid. In the specific example herein stated, 219 pounds of wax (75% of which consisted of paraffin and 25% of which consisted of carnauba) and 42 pounds of stearic acid were melted at a temperature of about 200° F. and then poured into the hot alkaline aqueous solution. It will be evident that in this batch a dispersion of the waxy constituents in the water is obtained, such dispersion being accompanied by the simultaneous formation of sodium stearate. After this waxed dispersion has cooled, it is mixed with the previously made and cooled shellac dispersion. The finished composition therefore consists of:

| | Pounds |
|---|---|
| Water | 2000 |
| Shellac | 100 |
| Waxy constituents | 219 |
| Stearic acid | 42 |
| Triethanolamine | 20 |
| Sodium hydroxide | 6 |

The composition prepared as above described contains about 4% of shellac, about 8½% of wax and about 84% of water, the remainder consisting of soaps. It is a stable and neutral liquid. When it is desired to use this composition for coating fruits or vegetables, it is diluted with a sufficient quantity of water to form a suspension having the desired wax and shellac content. The concentrated composition may also be used in fortifying previously used baths which had been depleted of their wax content.

It is to be understood that the procedural steps specifically recited in the example may be appreciably varied. The dispersion of wax need not be, for example, accompanied by the simultaneous formation of a soap (although this method of procedure has been found to give improved results), as a neutral soap such as laundry soap can be used instead. When shellac containing its natural wax content is employed, the shellac solution or dispersion is preferably permitted to cool and the wax then skimmed from the surface, or the shellac solution is filtered for the removal of the solidified wax. Better results are obtained, however, by the use of dewaxed shellac. During the preparation of concentrated compositions it is desirable to cool the mixture below the melting or softening temperature of the waxy constituents employed before discontinuing agitation or mixing the two separate shellac-alkali and soap-wax batches in order to prevent clumping or agglomeration of the waxy constituents.

In all instances the finished composition contains shellac and an added waxy constituent. If no waxy constituents are used, the resulting composition imparts an extremely glossy, unnatural appearance to the fruit or vegetable. When the ratio between the shellac and the waxy constituents is reduced so that the composition contains less than 1 part of shellac to 4 parts of wax, the desired glossy appearance is not obtained and instead a dull appearance is imparted to the fruit.

The finished composition is preferably non-oleaginous and free from unsaponified or unsaponifiable constituents, as the presence of such oleaginous or unsaponified constituents impairs the desired quick drying and gloss imparting properties of the composition.

The solutions and dispersions produced from the ingredients above described may be applied to fruits and vegetables by dipping the fruit therein or spraying the same onto the fruit, after which the fruit is permitted to dry. The drying takes place in a short period of time (2 minutes, in certain examples). If desired, the drying may be hastened by passing the fruit under blowers, although this has not been found necessary.

The coating composition appears to wet the fruit thoroughly without the formation of residual drops, so that a uniform, thin film of waxy constituents is deposited upon the fruit. The composition, furthermore, has the peculiar action of removing from the fruit any water or aqueous solution thereon resulting from previous processes or steps of washing the fruit or contacting the fruit with solutions of mold-inhibiting agents, whereby the coating composition of this invention may be applied to wet fruit and the fruit quickly dried.

The invention has been successfully employed on citrus fruits, melons, and the like, thereby preventing drying and shrinkage of the fruit in transit to market or in storage. In the treatment of melons, it is to be remembered that they are generally picked in an undeveloped, immature state and undergo a ripening process in transit to the market. This ripening is retarded if the evaporation or drying of the melons is prevented. It is highly desirable to inhibit or retard the drying and ripening of melons in order to permit the fruit to reach the market in a desired state of maturity and not in an overripe or decayed condition. As the coating compositions of this invention are just as effective when used at normal atmospheric temperatures or temperatures of the order of 45° F.–65° F., the coating process may be combined with a chilling process whereby the melons are simultaneously coated and chilled.

By applying the composition of this invention to vine-ripe cantaloups, their edible life is greatly prolonged, the fruit retaining their firmness and flavor and exhibiting pronounced resistance to spotting, shriveling and mold. A carefully conducted test on cantaloups conducted at Phoenix, Arizona, definitely showed that melons treated with the composition of this invention lost total sugar content much more slowly than unwaxed melons and that there was a greater accumulation of invert sugar, with a greater resulting sweetness, over an eight day storage period. Watersoaking of the flesh about the seed cavity did not occur in the treated melons, whereas Arizona melons have a bad reputation for developing this condition.

Numerous changes and modifications may be made as will be apparent to those skilled in the art. For example, a small quantity of an antiseptic or mold-inhibiting agent may be added directly to the aqueous solution and dispersion of this invention.

This application is a continuation-in-part of application Serial No. 652,699, filed January 20, 1933, and application Serial No. 36,558, filed August 16, 1936.

All changes, modifications and adaptations coming within the scope of the appended claims are embraced thereby.

I claim:

1. A process of coating fruit and vegetables with a uniform film, which comprises contacting fruit and vegetables with a substantially neutral aqueous fluid comprising an aqueous base containing waxy constituents dispersed therein and also containing products of reaction between dewaxed shellac and an alkali, said composition containing from about 0.75% to 4% of waxy constituents and products of reaction derived from about 0.15% to 4% of shellac.

2. A process of coating fruit and vegetables with a uniform film, which comprises contacting fruit and vegetables with a substantially neutral aqueous fluid comprising an aqueous base containing waxy constituents dispersed therein and also containing products of reaction between dewaxed shellac and an alkali, said composition containing from about 0.75% to 4% of waxy constituents and products of reaction derived from about 0.15% to 4% of shellac, said composition also containing soap in quantity not exceeding on an anhydrous basis about ⅓ of the weight of waxy constituents.

3. A process of coating fruit and vegetables with a uniform film, which comprises contacting fruit and vegetables with a substantially neutral aqueous fluid comprising an aqueous base containing waxy constituents dispersed therein and also containing products of reaction between dewaxed shellac and an alkali, said composition containing from about 0.75% to 4% of waxy constituents and products of reaction derived from about 0.15% to 4% of shellac, said composition having a surface tension of from about 24 to 30 dynes per centimeter.

4. A process of increasing the edible life of melons, which comprises contacting vine-ripe melons with an aqueous fluid composition having a surface tension of between about 24 and 30 dynes per centimeter, said composition containing from about 0.75% to 4% of a mixture of paraffin wax and carnauba wax and products of reaction derived from a reaction between about 0.15% to 4% of dewaxed shellac and an alkali, separating the melons from contact with said aqueous fluid, and permitting said melons to dry without polishing the same.

5. A liquid composition adapted for use in treating fruits and vegetables, comprising an aqueous medium containing waxy constituents dispersed therein and also containing products of reaction between shellac and triethanolamine, said composition containing from about 0.75% to 4% of waxy constituents and from about 0.15% to 4% of shellac, 1 to 4 parts of the waxy constituents being present to 1 part of shellac, said composition having the property of drying quickly on fruits and vegetables to form a uniform film thereon.

6. A liquid composition adapted for use in treating fruits and vegetables, comprising an aqueous medium containing waxy constituents dispersed therein and also containing products of reaction between shellac and an alkali, said composition containing from about 0.75% to 4% of waxy constituents and from about 0.15% to 4% of shellac, 1 to 4 parts of the waxy constituents being present to 1 part of shellac, said composition being adapted to dry quickly on fruits and vegetables to form a uniform film thereon.

7. An aqueous emulsion for coating fruits and vegetables, which comprises an aqueous base and a wax-like coating material emulsified therein, the emulsifying agent consisting of the gum soap resulting from the reaction between dewaxed shellac and an alkali, the amount of dewaxed shellac being less than the amount of wax-like coating material.

8. A coating composition adapted for coating fruit and vegetables with a uniform film and having the property of drying quickly on the fruit and vegetables, said composition being a substantially neutral aqueous fluid comprising an aqueous base containing waxy constituents dispersed therein and also containing products of reaction between dewaxed shellac and an alkali, said composition containing from about 0.75% to 4% of waxy constituents and products of reaction derived from about 0.15% to 4% of shellac, the amount of waxy constituents being in excess of the amount of shellac.

9. A coating composition adapted for coating fruit and vegetables with a uniform film and having the property of drying quickly on the fruit and vegetables, said composition being a substantially neutral aqueous fluid comprising an aqueous base containing waxy constituents dispersed therein and also containing products of reaction between dewaxed shellac and an alkali, said composition containing from about 0.75% to 4% of waxy constituents and products of reaction derived from about 0.15% to 4% of shellac, the amount of waxy constituents being in excess of the amount of shellac, said composition also containing soap in quantity not exceeding on an anhydrous basis about ⅓ of the weight of waxy constituents.

10. A process of coating fruit and vegetables with a uniform film, which comprises contacting fruit and vegetables with a substantially neutral aqueous fluid comprising an aqueous base containing waxy constituents dispersed therein and also containing products of reaction between dewaxed shellac and an alkali, said composition containing from about 0.75% to 4% of waxy constituents and products of reaction derived from about 0.15% to 4% of shellac, the amount of waxy constituents being in excess of the amount of shellac, said composition having a surface tension of 30 dynes or less per centimeter.

11. A process of increasing the edible life of melons, which comprises: contacting vine-ripened melons with an aqueous fluid composition having a surface tension of 30 and less dynes per centimeter, said composition containing from about 0.75% to 4% of a mixture of paraffin wax and carnauba wax and products of reaction derived from a reaction between about 0.15% to 4% of shellac and an alkali, the amount of waxy constituents in said composition being not in excess of the amount of shellac, separating the melons from contact with said aqueous fluid, and permitting said melons to dry without polishing the same.

12. A liquid composition adapted for use in treating fruits and vegetables, comprising an aqueous medium containing waxy constituents dispersed therein and also containing products of reaction between shellac and an alkali, said composition containing from about 0.75% to 4% of waxy constituents and from about 0.375% to 2% of shellac, the amount of shellac being not in excess of the amount of wax within the ranges specified.

13. A liquid composition adapted for use in treating fruits and vegetables and having the property of drying quickly on fruits and vegetables to form a uniform film thereon adapted to retard evaporation and shrinkage of the fruits and vegetables, said composition comprising an aqueous medium containing waxy constituents dispersed therein and also containing products of reaction between shellac and triethanolamine, said composition containing from about 0.75% to 4% of waxy constituents and from about 0.375% to 2% of shellac, the amount of shellac being not in excess of the amount of wax within the ranges specified.

14. A method of making an aqueous composition adapted for use in coating fruit and vegetables with a uniform protective film comprising: dissolving shellac in an aqueous solution of alkali with the aid of heat, separately forming a dispersion of waxy constituents in an aqueous medium and intermixing the shellac dispersion with said waxy dispersion with accompanying agitation, and maintaining said agitation until the mixture is below about 90° F., said waxy constituents being added in the ratio of from about 1 to 4 parts thereof to 1 part of shellac, the amount of shellac in the aqueous composition comprising from 0.14% to 4%.

15. A method of making an aqueous composition adapted for use in coating fruit and vegetables with a uniform protective film comprising: dissolving shellac in an aqueous solution of alkali with the aid of heat, separately forming a dispersion of waxy constituents in an aqueous medium, cooling said shellac and waxy dispersions to temperatures of about 90° F., and then intermixing said dispersions, said waxy dispersion being intermixed with said shellac dispersion to form a composition containing from about 1 to 4 parts of waxy constituents to 1 part of shellac, the amount of waxy constituents comprising about 0.75% to 4% of the composition.

16. A process of coating fruit and vegetables with a uniform film, which comprises contacting fruit and vegetables with an aqueous phase and a wax-like coating material emulsified therein, the emulsifying agent consisting of the gum soap resulting from the reaction between shellac and an alkali, the amount of shellac being less than the amount of wax-like coating material.

JAGAN N. SHARMA.